United States Patent
Jiang

[19]

[11] Patent Number: 5,811,937

[45] Date of Patent: Sep. 22, 1998

[54] BULB-TYPE ELECTRONIC ENERGY-SAVING LAMP

[75] Inventor: Lei Jiang, Shanghai, China

[73] Assignee: Link USA International, Inc., New York, N.Y.

[21] Appl. No.: 628,546

[22] Filed: Apr. 10, 1996

[51] Int. Cl.[6] ...................................... H01J 7/44
[52] U.S. Cl. .............................. 315/56; 315/63; 315/32; 315/209 R; 313/49; 313/318
[58] Field of Search ................... 315/32, 56, 58, 315/59, 63, 209 R, 219; 313/44, 49, 318, 493; 362/197, 260, 267; 439/56, 119

[56] References Cited

U.S. PATENT DOCUMENTS

| | | | |
|---|---|---|---|
| 2,103,047 | 12/1937 | Uyterhoeven et al. | 176/124 |
| 2,369,767 | 2/1945 | Abernathy | 315/36 |
| 2,392,305 | 11/1946 | Beese | 176/122 |
| 2,476,616 | 7/1949 | Morehead | 315/58 |
| 4,300,073 | 11/1981 | Skwirut | 315/53 |
| 4,337,414 | 6/1982 | Young | 315/56 |
| 4,392,087 | 7/1983 | Zansky | 315/219 |
| 4,417,176 | 11/1983 | Kamei et al. | 315/59 |
| 4,647,820 | 3/1987 | Chermin et al. | 315/245 |
| 4,777,405 | 10/1988 | Hermes et al. | 313/634 |
| 4,794,301 | 12/1988 | Misono et al. | 313/490 |
| 4,857,806 | 8/1989 | Nilssen | 315/72 |
| 4,980,808 | 12/1990 | Lilos | 362/219 |
| 5,015,917 | 5/1991 | Nigg | 315/56 |
| 5,343,123 | 8/1994 | Nilssen | 315/219 |
| 5,381,073 | 1/1995 | Godyak et al. | 315/58 |
| 5,559,393 | 9/1996 | Nilssen | 315/58 |

*Primary Examiner*—Benny Lee
*Assistant Examiner*—Haissa Philogene
*Attorney, Agent, or Firm*—Graham & James LLP

[57] ABSTRACT

A fluorescent bulb-type electronic energy-saving lamp includes a screwshell and an electronic ballast sealed within the screwshell so that the lamp has the same shape and size as standard incandescent lamps thereby allowing the fluorescent bulb-type electronic energy-saving lamp to directly replace standard incandescent bulbs. The fluorescent bulb-type electronic energy-saving lamp also includes a fluorescent tube, a bulb cover surrounding the fluorescent tube and a connector for mounting the screwshell, the fluorescent tube and the bulb cover thereon.

5 Claims, 2 Drawing Sheets

FIG. 1
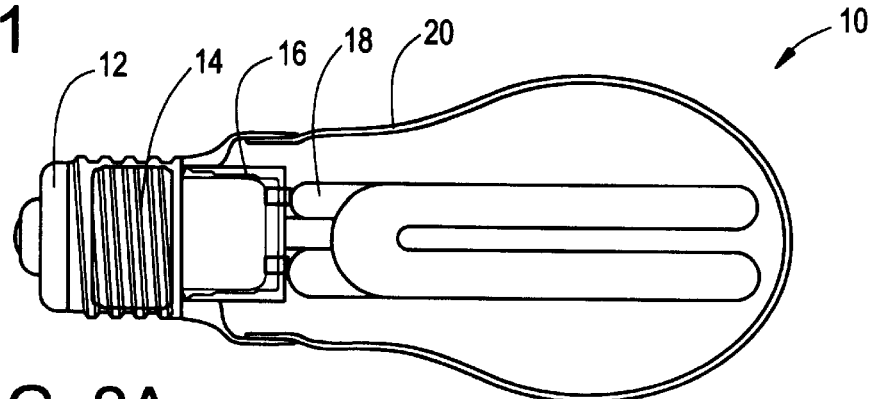
FIG. 2A
FIG. 2B
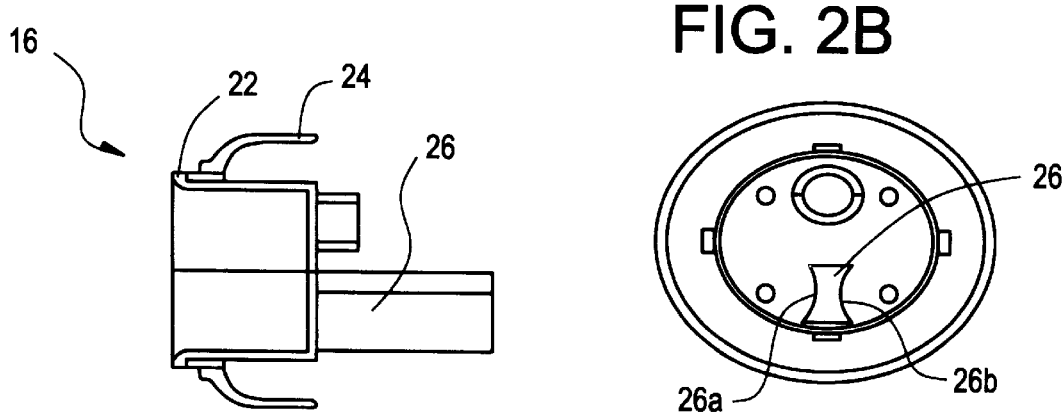
FIG. 3
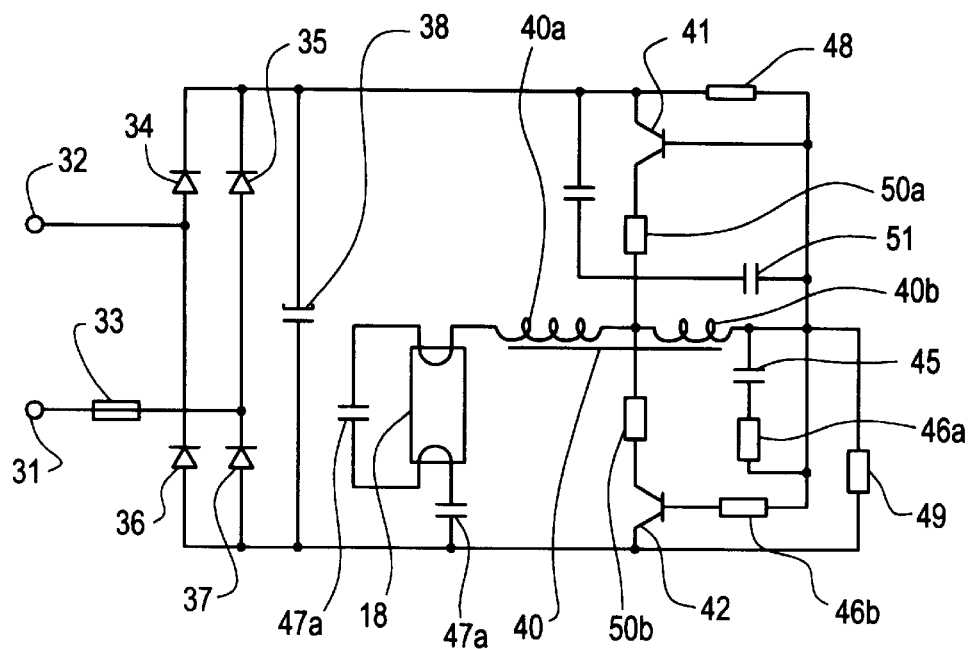

BULB-TYPE ELECTRONIC ENERGY-SAVING LAMP

BACKGROUND OF THE INVENTION

1. Field of the Invention

The present invention relates to a fluorescent bulb-type electronic energy-saving lamp which can be used as a direct replacement of a standard incandescent bulb in everyday illuminating, and more particularly, to a fluorescent bulb-type lamp having an electronic ballast located in a screw-shell between the screw shell and a fluorescent tube.

2. Description of Related Art

Because of the need to save energy, several attempts at developing an energy-saving replacement bulb for replacing incandescent bulbs have been made. However, the size and shape of conventional electronic energy-saving lamps are quite different from the general incandescent lamps. This difference usually causes problems in that the most often used lamp holders which are designed for incandescent bulbs are unable to accommodate conventional energy-saving lamps. Thus, the conventional energy-saving lamps cannot be used in standard incandescent lamp holders but instead must be used in new lamp holders designed especially for use with a particular energy-saving lamp.

In addition, the electronic ballasts of conventional fluorescent energy-saving lamps have experienced several problems. The electronic ballast of a conventional energy-saving lamp is usually installed into a plastic shell located between the screwshell and the fluorescent tube. However, the shell is not a good heat conductor. Because of the heat generated from the energy dissipation of the electronic components and the heat generated from radiation of the fluorescent tube, the electronic ballast experiences a high temperature increase and has a low reliability.

A conventional bulb-type energy saving lamp 60 is shown in FIG. 4. The conventional bulb includes a screw-shell 62, an electronic ballast located in a plastic shell 64, a fluorescent tube (not shown) enclosed within a cover 66. As is clearly seen in FIG. 4, the conventional lamp 60 is must larger than conventional incandescent bulbs and the electronic ballast located in the plastic shell 64 is located between the screw-shell 62 and the fluorescent tube and cover 66, thereby increasing the size of the lamp 60. In addition, the electronic ballast 64 suffers from the disadvantages described above, i.e., high temperature increase and low reliability.

SUMMARY OF THE INVENTION

To solve the problems described above, the preferred embodiments of the present invention provide a bulb-type electronic energy-saving lamp which has the same shape and size as standard incandescent bulbs and therefore, can be used in standard lamp holders as a direct replacement for standard incandescent bulbs. More specifically, an electronic ballast of the present invention is not provided in a separate plastic cover located between a screwshell and a fluorescent tube as in the conventional fluorescent bulb-type electronic energy-saving lamps. Instead, the electronic ballast of the present invention is installed in a space provided in the screwshell, thereby eliminating the need for the separate plastic cover and avoiding the problems of high temperature increase and low reliability experienced in conventional fluorescent bulb-type electronic energy-saving lamps.

The preferred embodiments of the present invention provide a fluorescent bulb-type electronic energy-saving lamp including an electronic ballast directly sealed into a space inside a screwshell, wherein the screwshell, a fluorescent tube and a bulb cover are integrated by a connector to form a fluorescent bulb-type electronic energy-saving lamp. The bulb-type electronic energy-saving lamp of the preferred embodiments of the present invention has the same shape and size as a standard incandescent bulb so that the bulb-type energy-saving lamp can easily and directly replace standard incandescent bulbs or even other bulb-type energy-saving lamps of the preferred embodiments of the present invention.

Compared to a standard incandescent bulb with the same lumens, the fluorescent bulb-type electronic energy-saving lamp of the preferred embodiments of the present invention uses 70% energy, has a 50% lower temperature increase and five times longer life.

The electronic ballast used in the preferred embodiments of the present invention is preferably sealed in a space inside the screwshell by using a sealing material which is a good insulator and also is a very good heat conductor. Due to the good heat conductibility of the metal screwshell and the sealing material, the heat generated by the electronic ballast is dissipated rapidly through the metal screwshell. Therefore, the electronic ballast has a lower temperature increase and thus an improved reliability as compared with conventional devices. At the same time, the screen effect of the metal screwshell on the high frequency electromagnetic waves generated by the electronic ballast during operation can greatly reduce the high frequency electromagnetic radiation present in the proximity of the bulb-type electronic energy-saving lamp.

In a preferred embodiment, at least two mutual compensating transistors (one PNP, one NPN) are used in the oscillating switching circuit which is provided in the electronic ballast to generate a high frequency electric current. As a result, alternative switching can be controlled by only one feedback coil and auxiliary electronic components. So, the electronic ballast has less components and thus, has a higher stability, reliability and efficiency.

In another preferred embodiment, the bottom portion of the connector which is used to mount the fluorescent tube preferably comprises a plastic rod having a groove on both sides, the groove having the shape of an arc, which can be changed to a square, or a triangle, if necessary. Both ends of the fluorescent tube can be directly plugged into the grooves of the rod and then the fluorescent tube is fixed to the connector by an adhesive or other suitable joining material. With such a structure, it is easy to locate the tube on the connector, and so the assembling technique is greatly simplified as compared with the prior art techniques.

According to another preferred embodiment of the present invention, a method of manufacturing a fluorescent bulb-type electronic energy-saving lamp includes the steps of connecting a fluorescent tube and a bulb cover onto a connector, installing an electronic ballast in a screwshell, mechanically fixing the screwshell containing the electronic ballast to the connector to thereby integrate all of the above components into a complete bulb-type electronic energy-saving lamp. The method according to one of the preferred embodiments of the present invention provides a simple bulb-type electronic energy-saving lamp which is manufactured and assembled using a simple technique making the inventive bulb-type energy saving lamp easy to reproduce.

Other features and advantages of the present invention will become apparent from the following description of the preferred embodiments of the present invention which refers to the accompanying drawing

BRIEF DESCRIPTION OF THE DRAWINGS

For the purpose of illustrating the present invention, there is shown in the drawings an embodiment which is presently preferred; it being understood, however, that the invention is not limited to the precise arrangements and instrumentalities shown.

FIG. 1 is a schematic view of a preferred embodiment of a fluorescent bulb-type electronic energy-saving lamp of the present invention;

FIG. 2A is a side view of a connector used in the preferred embodiment shown in FIG. 1;

FIG. 2B is a side view of a connector used in the preferred embodiment shown in FIG. 1;

FIG. 3 is a circuit diagram of an electronic ballast used in the preferred embodiment shown in FIG. 1.

DETAILED DESCRIPTION OF PREFERRED EMBODIMENTS

Figure 4:
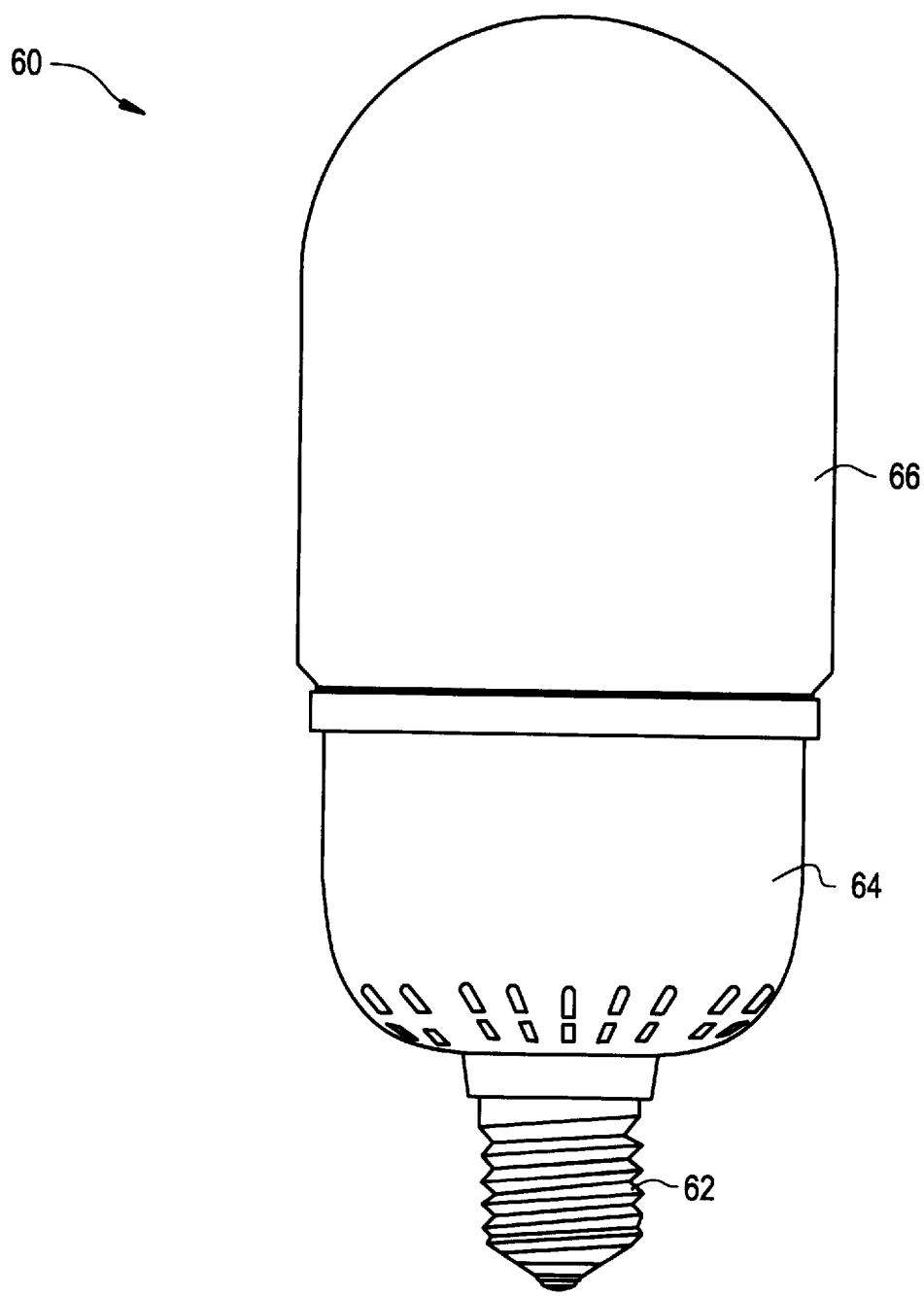
FIG. 4 is a schematic diagram of a conventional bulb-type electronic energy-saving lamp.

Referring now to the drawings wherein like numerals indicate like elements, there is shown in FIG. 1 a fluorescent bulb-type electronic energy-saving lamp 10 according to one preferred embodiment of the present invention.

The lamp 10 includes a screwshell 12, which may be an E26 or E27 standard screwshell, preferably formed of metal. The screwshell 12 includes a space formed therein for receiving and mounting an electronic ballast 14 as described later. After the electronic ballast 14 is installed in the space in the screwshell 12, the screwshell is sealed with a material that is a good insulator and also a very good heat conductor. Due to the good heat conductibility of the metal screwshell 12 and the sealing material, the heat generated by the electronic ballast 14 is dissipated rapidly through the metal screwshell 12. Therefore, the electronic ballast 14 has a lower temperature increase and thus an improved reliability as compared with conventional devices. At the same time, the screen effect of the metal screwshell 12 on the high frequency electromagnetic waves generated by the electronic ballast 14 during operation can greatly reduce the high frequency electromagnetic radiation present in the proximity of the bulb-type electronic energy-saving lamp 10.

The lamp further includes a connector 16 which is preferably made of plastic or some other suitable material. When sealing the screwshell 14 as described above, a space is defined at the end of the screwshell 12 to facilitate the mechanical connection with the connector 16. The screwshell 12 is preferably mechanically fixed on the connector 16 or can be fixed by any other suitable means.

The lamp 10 further includes a fluorescent tube 18 and a bulb cover 20 which are fixed on the connector 16 preferably via an adhesive which has both a high heat-resistance and ageing-resistance. The bulb cover 20 can have a variety of different shapes and the shape thereof only depends on the style of the common incandescent bulbs. Among the possible shapes for the bulb cover 20 are a bulb-type, sphere-type, mushroom-type, candle-type, etc. The inner and outer face of the bulb cover 20 can be processed in many ways to achieve a variety of illuminating effects, among them are frosting, white painting, figuring, reflecting filming, etc.

In the preferred embodiments of the present invention, the electronic ballast 14 preferably includes a wiring board and electronic components. The wiring board (not shown) is preferably a round-shaped printed wiring board with a diameter smaller than that of the screwshell 12. The electronic ballast 14 is sealed into the screwshell 12 as described above. The wiring board faces the power-input end of the fluorescent tube 18 while electronic components on the board face the opening of the tube 18.

As seen in FIGS. 2A and 2B, the connector 16 includes a connecting portion 22 which is mechanically connected to the screwshell 12, a mounting portion 24 for mounting the bulb cover 20. The mounting portion 24 is connected to the bulb cover 20 using adhesive or other suitable material. The connector 16 further includes a rod 26 which is used to fix the fluorescent tube 18 in place. The rod 26 has a pair of grooves 26a, 26b formed on opposite sides thereof. The grooves 26a, 26b shown in FIGS. 2B have an arc shape. However, the grooves 26a, 26b can be a square, or a triangle, or other suitable shape. Both ends of the fluorescent tube 18 are directly plugged into the grooves 26a, 26b of the rod 26 and then the fluorescent tube 18 can be fixed to the connector 16 by an adhesive or other suitable joining material. With such a structure, it is easy to locate the tube 18 on the connector 16, and so the assembling technique is greatly simplified as compared with the prior art techniques.

In the preferred embodiments of the present invention, the circuit of the electronic ballast 14 is shown in FIG. 3. Inputs 31 and 32 are provided for receiving alternating current input. A fuse 33 is connected into the circuit in series connection. The alternating power input is rectified and filtered by passing through diodes 34, 35, 36 and 37 and a filtering capacitor 38 to convert the alternating current into a direct current. This direct current is converted to a high frequency alternative current with a frequency of about 25–75 KHz by the high frequency oscillating switching circuit which includes a high frequency transformer 40, a NPN transistor 41, a PNP transistor 42 and auxiliary electronic components. The high frequency transformer 40 is preferably composed of two coils, the output coil 40a and the feedback coil 40b. The oscillating feedback high frequency current is transported to the bases of the two switching transistors 41, 42 through the capacitors 45 and the resistors 46a and 46b. The orientations of the output coil 39a and the feedback coil 39b should satisfy the condition which will keep the transistors in this circuit working in positive feedback states to ensure that the two transistors 41, 42 will switch alternatively when the oscillating starts in the circuit. Then, the high frequency current output from the output coil 40a of the high frequency transformer 40 will pass through the capacitor 47a to ignite the fluorescent tube 18.

A capacitor 47b is connected to both ends of the fluorescent tube 18 as shown in FIG. 3. Once the power is turned on, the harmonic oscillating voltage generated by the capacitor 47b and the inductance of the coil 40a will ignite the fluorescent tube 18.

The resistors 50a and 50b and the capacitor 51 are used to stabilize the working states of the oscillating switching transistors 41, 42.

In the circuit shown in FIG. 3, the two ends of the resistor 48 are connected to the collector and the base of the transistor 41, respectively. The two ends of the resistor 49 are connected to the negative input 31 of the direct electric power source and one end of the feedback coil 40b. The other end of the coil is connected to the emitter of the transistor 41 through the resistor 50a, when the power of the circuit is turned on, the resistor 48 and resistor 49 will help the transistor 41 to establish an initial working state with a small current. The positive feedback current provided by the high frequency transformer 40, the coil 40a and coil 40b will make the transistor 41 oscillate with a high frequency and establish a alternative switching between the transistor 41 and the transistor 42 in a short time.

A bridge rectifier and a filter, or a double voltage rectifier and a filter can be used as the rectifying and filtering part of the electronic ballast circuit as shown in FIG. 3. The selection depends on the inputting alternative power source and the structure of the electronic ballast.

In one preferred embodiment of the present invention, an electronic energy-saving lamp had the following characteristics:

| | |
|---|---|
| full body length | 115 mm |
| bulb diameter | 60 mm |
| power | 5.3 w |
| luminous flux | 262 lumen |

Although the present invention has been described in relation to particular preferred embodiments thereof, many other variations and modifications and other uses will become apparent to those skilled in the art.

What is claimed is:

1. A bulb-type electronic energy-saving lamp comprising:
    a screwshell having an inner space located between a lower surface and an upper portion thereof;
    an electronic ballast located within and directly sealed into said inner space inside of said screwshell;
    a sealing material sealing said upper portion of the screwshell so that the electronic ballast is sealed directly within said screwshell;
    a connector connected to said screwshell;
    a fluorescent tube connected to said connector and said electronic ballast; and
    a bulb cover connected to said connector and disposed so as to surround said fluorescent tube.

2. The bulb-type electronic energy-saving lamp according to claim 1, wherein said sealing material comprises a material that is a heat conductor and insulator.

3. The bulb-type electronic energy-saving lamp according to claim 1, further comprising an oscillating switching circuit for generating a high frequency current in said electronic ballast.

4. The bulb-type electronic energy-saving lamp according to claim 3, wherein said oscillating switching circuit includes two mutual compensating transistors and a single feedback coil for controlling alternative oscillating switching of said two transistors.

5. The bulb-type electronic energy-saving lamp according to claim 1, wherein said connector includes a rod located at a bottom portion of said connector and having a groove disposed on both sides thereof for receiving two ends of said fluorescent tube to mount the fluorescent tube on said connector.

\* \* \* \* \*